March 1, 1966  D. McKEOWN  3,237,447
EROSION GAUGE
Filed Feb. 5, 1962

INVENTOR.
DANIEL McKEOWN
BY
Attorney
Agent

United States Patent Office 3,237,447
Patented Mar. 1, 1966

3,237,447
EROSION GAUGE
Daniel McKeown, La Jolla, Calif., assignor to General Dynamics Corporation, San Diego, Calif., a corporation of Delaware
Filed Feb. 5, 1962, Ser. No. 171,125
4 Claims. (Cl. 73—86)

This invention relates to an erosion gauge, and more particularly to a gauge for measuring the erosion of any of a plurality of surface materials due to evaporation, bombardment by high velocity atomic particles, and micrometeorite impact.

The durability of materials, particularly coating materials, is unknown to a large extent in such environments as outer space. When such materials are to be employed aboard an artificial satellite requiring a long useful life as, exemplarily, a global communications satellite, knowledge of the erosion rate is required. The present invention enables measurement of such erosion with extreme accuracy over a long period of time.

A piezo-electric crystal is coated with the material to be tested. The coated crystal is placed where particles, etc. may bombard the coating. The crystal is connected in an oscillator circuit. As the coating material is eroded away, the natural resonant frequency of the crystal increases in direct proportion. The change in crystal frequency is measured by comparison with a reference crystal oscillator. A mixer and filter selects the difference frequency, which may be telemetered directly to a ground station.

It is, therefore, an object of this invention to provide a gauge for measuring erosion of coating materials in a space environment.

Another object of this invention is to measure erosion of a material on a piezo-electric crystal.

Another object of this invention is to provide means for measuring erosion of a surface material in a space environment by the change of resonant frequency of a crystal oscillator.

Another object of this invention is to provide a space environment erosion measuring device which is simple, light, compact, reliable, and accurate.

Other objects and advantages of this invention will become apparent for the following specification and drawings, wherein.

Figure 1:
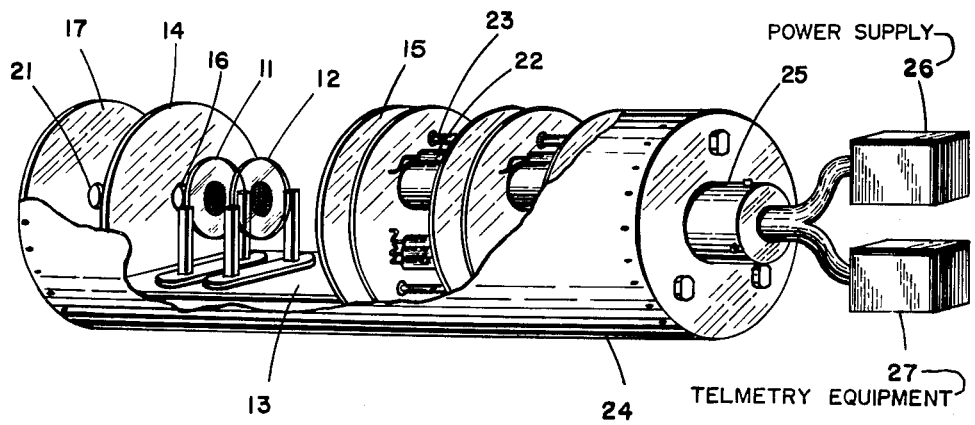
FIGURE 1 illustrates the erosion gauge of the present invention.
Figure 2:
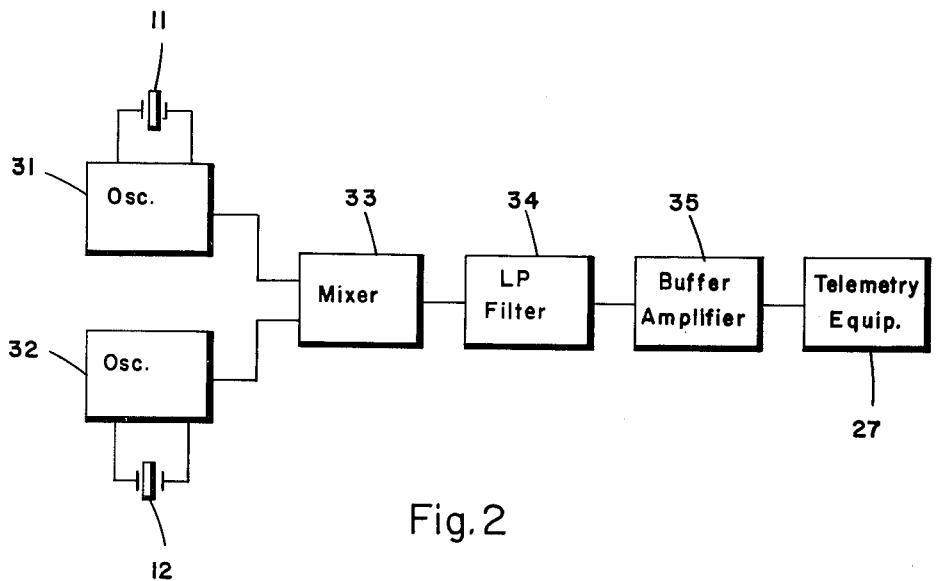
FIGURE 2 is a schematic block diagram of the circuit employed in the gauge of FIGURE 1.

Referring now to FIGURE 1 of the drawing, a test quartz piezo-electric crystal 11 and a reference quartz piezo-electric crystal 12 are mounted on a rigid platform 13. Platform 13 is suitably fastened to a front bulkhead 14 and to a rear bulkhead 15.

Front bulkhead 14 is provided with an aperture 16 adjacent test piezo-electric crystal 11. A collimating bulkhead 17 having an aperture 21 in line with aperture 16 is suitably fastened to front bulkhead 14. Electronic circuit modules, such as module 22 are mounted on rods such as 23 fastened to rear bulkhead 15. Cylindrical case 24 is provided to enclose and protect the erosion gauge of the present invention. A multi-conductor electrical connector 25 enables connection of the erosion gauge to a suitable power supply 26 and telemetry equipment 27.

Included within the electronic circuit modules such as 22 is a first transistor oscillator circuit 31 connected to test crystal 11, and a second crystal oscillator circuit 32 connected to reference crystal 12. Oscillators 31 and 32 are connected to a mixer circuit 33. The difference frequency from mixer circuit 33 is selected by a low-pass filter 34. The difference frequency output is applied to a buffer amplifier 35, and thence to suitable utilization equipment, such as telemetry equipment 27. All of oscillator circuits 31 and 32, mixer 33, low pass filter 34 and buffer amplifier 35 are conventional, of a type well-known to those skilled in the art, employing transistors as active elements.

Crystals 11 and 12 are AT cut quartz resonators, minimizing change of frequency with temperature. Further, both crystals are placed side by side in the same compartment, so that any residual drift will be similar. Both crystals 11 and 12 are ground to resonate at a frequency of about ten megacycles in a presently preferred embodiment. However, the reference crystal 12 resonant frequency is placed one kilocycle below that of transducer crystal 11.

Both of crystals 11 and 12 are provided with gold plated electrodes. Gold is employed since it does not "outgas" in a vacuum, which would vary the plating mass unpredictably. Test on transducer crystal 11 is additionally coated with the material to be tested. Materials which have been tested include enamels, aluminum, and silicon monoxide. Obviously, any material which will adhere to the gold plate may be tested.

The erosion gauge of the present invention is then placed in the environment wherein the material durability is to be tested. Exemplarily, it may be carried as a portion of the payload of an artificial satellite placed in orbit. Collimating bulkhead 17 is, of course, exposed to the space environment. The coating on transducer crystal 11 will be eroded as by evaporation into the vacuum of space, impacts of micrometeorites, and bombardment by ionic and atomic particles.

Erosion is measured by the change of resonant frequency of transducer crystal 11. As is well known to those skilled in the art, an energized crystal is a mechanically vibrating plate having a mass equivalent to circuit inductance and compliance equivalent to circuit capacitance. The pertinent parameter employed in the present invention is the inductance which is dependent upon the resonating mass of the transducer crystall 11 and its coating. The resonant frequency $f$ of crystal 11 varies as the thickness $t$ varies in accordance with the relation:

$$\Delta f = -k\frac{\Delta t}{t^2}$$

wherein $\Delta t$ is the change in thickness and $k$ is a constant equal to $1.66 \times 10^6$ cycles-millimeters per second. The plating thickness removed for a one cycle increase in frequency is $0.17 \times 10^{-8}$ centimeters.

As disclosed hereinabove, coated transducer crystal 11 originally oscillates at a frequency one kilocycle higher than reference crystal 12. Thus, the difference frequency of one kilocycle is selected by low pass filter 34, and passed to telemetry equipment 27 by buffer amplifier 35. With the erosion gauge of the present invention in its intended environment, that is, aboard an orbiting satellite vehicle, it will normally be connected by means of a commutator to telemetry equipment common to other instruments aboard the vehicle for transmission of the beat frequency to earth. It may be desirable to divide the beat frequency by a known division, as with a scaler, to lower the demands on the telemetry equipment.

As the coating on transducer crystal 11 is eroded, the resonant frequency increases in accordance with the relation set forth hereinabove. As the frequency of oscillation of test oscillator 31 increases, the frequency difference between oscillators 31 and 32 increases, and the beat frequency output signal applied to the telemetry equipment increases. Thus, by measuring the difference frequency over a known period of time, the erosion rate of various materials in a space environment is known, and the best coating materials for employment on space vehicles may be selected.

This invention is not to be construed as limited to the particular form disclosed hereinabove, since this is intended to be illustrative rather than restrictive.

What I claim is:

1. An erosion gauge comprising an enclosure having an apertured bulkhead, a transducer piezo-electric crystal having a face adjacent said apertured bulkhead, a test material on said transducer crystal face adjacent said apertured bulkhead, a reference piezo-electric crystal near said transducer crystal and having a lower resonant frequency than said transducer crystal, a first oscillator circuit connected to said transducer crystal, a second oscillator circuit connected to said reference crystal, and means connected to said first and second oscillators for yielding the frequency difference between said first and second oscillators, whereby a change in said frequency difference is a measure of the erosion of said test material.

2. An erosion gauge comprising an enclosure having an apertured bulkhead, a transducer piezo-electric crystal having a face adjacent said apertured bulkhead, a test material on said transducer crystal face adjacent said apertured bulkhead, a reference piezo-electric crystal near said transducer crystal and having a lower resonant frequency than said transducer crystal, a first oscillator circuit connected to said transducer crystal, a second oscillator circuit connected to said reference crystal, a mixer connected to said first and second oscillators, and a filter connected to said mixer for yielding the frequency difference between said first and second oscillators, whereby a change in said frequency difference is a measure of the erosion of said test material.

3. An erosion gauge comprising an enclosure with a first compartment having an outward facing apertured bulkhead, a transducer piezo-electric crystal in said first compartment having a face adjacent said apertured bulkhead, a test material on said transducer crystal face adjacent said apertured bulkhead, a reference piezo-electric crystal in said first compartment and having a lower resonant frequency than said transducer crystal, a second compartment in said enclosure, a first oscillator circuit in said second compartment connected to said transducer crystal, a second oscillator circuit in said second compartment connected to said reference crystal, and circuit means in said second compartment connected to said first and second oscillators for yielding the frequency difference between said first and second oscillators, whereby a change in said frequency difference is a measure of the erosion of said test material.

4. An erosion gauge comprising an enclosure with a first compartment having an outward facing apertured bulkhead and a collimating bulkhead, a transducer piezo-electric crystal in said first compartment having a face adjacent said apertured bulkhead, a test material on said transducer crystal face adjacent said apertured bulkhead, a reference piezo-electric crystal in said first compartment and having a lower resonant frequency than said transducer crystal, a second compartment in said enclosure, a first oscillator circuit connected to said transducer crystal, a second oscillator circuit connected to said reference crystal, a mixer connected to said first and second oscillators, a filter connected to said mixer for yielding the frequency difference between said first and second oscillators, whereby a change in said frequency difference is a measure of the erosion of said test material, said first and second oscillator circuits, mixer and filter being mounted in said second compartment.

References Cited by the Examiner

UNITED STATES PATENTS 2,691,111 10/1954 Minnick _____ 324—56 X
2,877,338 3/1959 Berge _____ 324—56 X RICHARD C. QUEISSER, *Primary Examiner.*

W. L. CARLSON, *Examiner.*

J. P. O'BRIEN, J. JOSEPH SMITH, Jr.,
*Assistant Examiners.*